United States Patent Office 3,415,504
Patented Dec. 10, 1968

---

3,415,504
MATERIAL DISTRIBUTING DEVICE IN A
VERTICAL KILN
William D. Smith and Henry J. Liebmann, Barberton, Ohio, assignors to PPG Industries, Inc., a corporation of Pennsylvania
Filed Mar. 20, 1967, Ser. No. 624,432
28 Claims. (Cl. 263—29)

ABSTRACT OF THE DISCLOSURE

A series of at least two truncated conical shells are disposed to lie in the path of falling particulate material in order to distribute the particulate material in a pile of substantially uniform depth. The upper truncated conical shell is the larger, and both shells have their smaller ends uppermost.

BACKGROUND OF THE INVENTION

This invention relates to apparatus for handling particulate materials and disposing them in a pile. In the illustrated embodiment, the invention is used in a vertical kiln for calcinating limestone. The limestone is dumped from a centrally located chute at the top of the kiln. The invention may find equally satisfactory utility in material handling systems for charging bins, blast furnaces, grain storage facilities or other enclosed vessels. It is also contemplated that this invention may be used for providing a pile having a uniform depth of particulate material in open areas where there are no confining side walls.

The prior art is abundant with deflectors which aid in providing a uniform distribution of particulate material. For many years, it has been conventional in vertical kiln construction to provide a solid Archimedian cone centrally located in the path of the entering material. Mechanical means are provided for rotating such a cone about a vertical axis in order to provide the desired uniform distribution. One manner of providing such rotation is described in U.S. Patent 2,628,829 which issued on Feb. 17, 1953 to Joseph D. Ruiz. Of course, the use of mechanical means for rotating the cone adds appreciably to installation and maintenance expenses. Gas leakage around the rotary seals results in the loss of the carbon dioxide which is to be claimed in a limestone calcinating kiln. The present invention eliminates the moving parts and thus reduces the operating losses and maintenance expenses which result from the use of this particular prior art structure.

Another type of material distributing device somewhat akin to the present invention is the subject matter of U.S. Patent 2,600,053 which issued on June 10, 1952, to Arthur T. Grisenthwaite et al. This device involves a plurality of downwardly and outwardly radiating chutes which receive material from a common, centrally located source. In effect, this apparatus causes a charge of material to be distributed in a plurality of spaced apart, peaked piles each of which is located an equal distance from the center of the apparatus. There is also a central pile produced by a central chute.

It is thought that the present apparatus will provide a more uniform depth of material than will the apparatus of Grisenthwaite et al. since this invention produces an annular disposition of the fallen material rather than a series of spaced apart peaks. Also, it is to be noted that this invention results in at least two such annular patterns. From an operational viewpoint, the present invention is less subject to material stoppage due to clogging or bridging, since there is a sequential rather than a simultaneous selection of the material which is deflected into the various paths. The same may be said in contrasting this invention to the structure illustrated in German Patent 251,195 dated Sept. 2, 1912.

SUMMARY

This invention pertains to baffle-like conical deflectors which intercept a falling mass of particulate material in order to produce a pile of material which has a relatively uniform depth. The upper baffle has a central opening which is surrounded by downwardly and outwardly sloping walls. This baffle may be a truncated conical shell as illustrated herein. Below the upper baffle, there is another baffle member which also has a central opening and downwardly and outwardly sloping walls. This, too, may be in the form of a truncated conical shell. This latter baffle is smaller than the upper baffle and its opening is smaller and below the opening in the upper baffle. If desired, there may be a centrally located and conical third member for intercepting the material which falls through the opening in the lower truncated conical shell.

Aside from the broad concept of this invention, there are certain relationships worthy of note which exist between the baffles themselves and between the baffles and their environment. Before discussing some of these relationships, it is necessary to mention the bridging or plugging problems which exist in the handling of solid particulate materials. This happens when the particles align to form roughly an inverted-U or arch-shaped structure over an opening. The "bridge" so formed may cause partial or total reduction of the flow through the opening. The extent of this problem is a function of the size of the particles, the size of the outlet opening, the velocity of the particles and other factors.

This invention seeks to avoid the stoppage which results from bridging or plugging by presenting a design in which (1) the material attains a free fall velocity before being deflected, (2) the material is *sequentially* diverted by the baffles so that an optimum-sized opening may be used in each baffle, and (3) the size through the openings in each truncated baffle is sufficiently large to prevent bridging under most circumstances.

The structure which permits the falling material to attain a free fall velocity is the location of the charging chute at a distance above the upper truncated baffle.

The sequential diversion of the material is accomplished by locating the opening in the lower truncated baffle below the opening in the upper truncated baffle. If these openings were located in a common horizontal plane, they would have to be substantially larger to avoid bridging of the falling material.

Another deterrent to bridging is the provision of the truncated baffles with openings which have diameters greater than four times the size of the largest particles being handled.

In one specific embodiment of the present invention, two truncated conical baffles were used. The effective diameter of the opening in the upper baffle was approximately equal (1) to the vertical distance from the charging chute to the upper baffle and (2) to the diameter of the outlet of the charging chute. The effective diameter of the opening in the lower truncated conical baffle was equal to the vertical distance between the upper edges of the two truncated conical baffles. The inclination of the upper surfaces of both truncated conical baffles was forty-five degrees. This construction resulted in an even distribution of the material distributed therebelow.

With the above-discussed background and construction in mind, it will be appreciated that a principal object of this invention is to provide a relatively uncomplicated and inexpensive apparatus for deflecting a free falling mass of particulate material so that it will fall in a pile of substantially uniform depth.

Another object is to provide apparatus of the type described which will not become plugged or momentarily stopped by the bridging of the particulate material.

Further objects and advantages deriving from this invention will be appreciated from a study of the following detailed description of but one of many possible embodiments.

DESCRIPTION OF THE ILLUSTRATED EMBODIMENT

Figure 1:
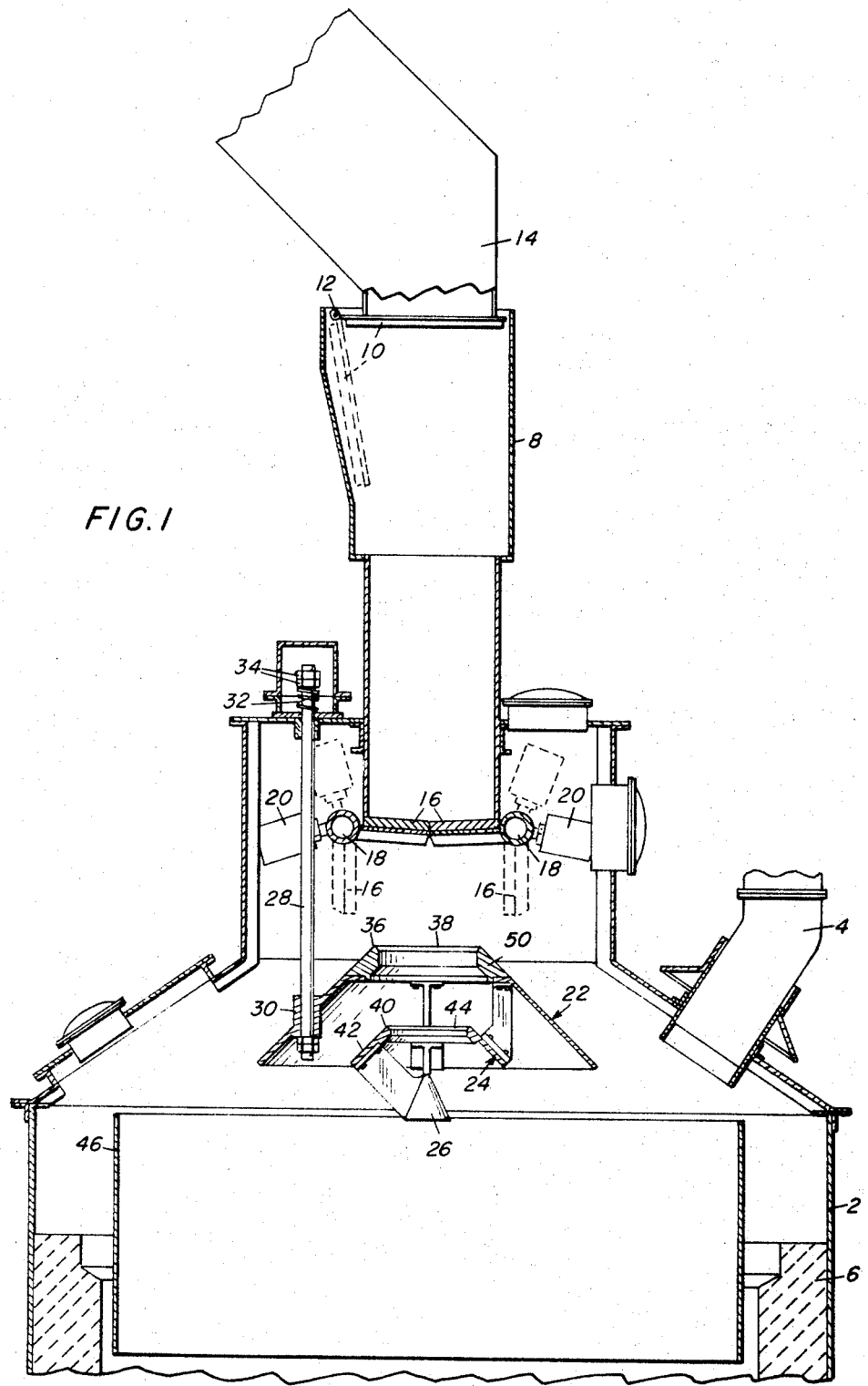
FIG. 1 is a sectional elevation of a vertical kiln which incorporates the material distributing device of this invention.

As described in the foregoing background of the invention, one suitable environment for this invention is in vertical kilns of the type used for calcinating limestone. Such a kiln embodying the present invention is illustrated in FIG. 1. The kiln includes a metallic casing 2 which is substantially air-tight in order to confine the carbon dioxide gas produced during the calcinating operation. These gases are normally drawn off through the outlet conduit 4. The lower portions of the kiln contain a refractory lining 6. The illustrated kiln is fired by coke which is incorporated with the limestone particles introduced to the kiln, but natural gas or other firing means may be used.

A vertical kiln of this type is conventionally charged by a centrally located chute at its upper portion. The particular chute disclosed includes a charging hopper or magazine 8 which at its inlet has a single leaf, sealed, counterweighted door 10 which is hinged at 12. The door 10 swings open automatically, due to the weight of limestone thereabove in the upper hopper 14. While, as shown in the drawing, the door automatically swings open, this is not a necessary part of the invention and the door may be opened before the stone is charged into the hopper or magazine 8. The outlet opening at the lower end of the charging hopper or chute 8 is normally obstructed by the double trap doors 16. These doors 16 are pivoted at 18 and counterweighted by the members 20. Usually, an electrical locking device (not shown) prevents the opening of the double trap doors 16. However, upon actuation of the locking device when it is desired to charge the kiln, the doors 16 swing to the position illustrated in broken lines in FIG. 1 in order to open the outlet opening at the lower end of the chute 8, and discharge its contents into the kiln.

Of course, when stones are introduced into a kiln in the foregoing manner, it is desirable to distribute them evenly in the area between the refractory walls 6. Toward this end, there is a series of conical baffles which acts upon the falling material passing through the outlet opening of the charging chute 8. This series of baffles includes an upper member 22, an intermediate member 24, and a lower member 26. The upper and intermediate members 22 and 24 are truncated conical shells which have their smaller ends uppermost. The intermediate member 24 is smaller than the upper member 22. Located below the opening in the intermediate member 24 is a generally solid conical deflector 26 with its apex pointed upwardly.

The assembly including the conical deflectors 22, 24 and 26 is supported by a plurality of depending rods, one of which is illustrated at 28. Each of these rods passes through a suitable apertured boss 30 which is located in the upper member 22. At its uppermost end, each rod is resiliently supported on the casing of the kiln by a helical compression spring 32 which acts upwardly on the lock nuts 34 located at the upper end of rod 28. This particular means of support permit convenient vertical adjustment of at least one foot, and slight horizontal movement of the conical members 22, 24 and 26 in order to center them beneath the outlet opening of the charging chute 8 as they are struck by falling stones.

The principle of operation of the conical deflectors will be appreciated from the foregoing description. A charge of particulate material from the charging chute 8 falls freely a given distance before it encounters any of the conical members. A portion of the falling charge is intercepted by the upper edge 36 of the upper conical shell 22 and passes over the top surface of this member. The remainder of the charge passes through the opening 38 in the upper truncated conical member 22 and falls freely until it hits the upper edge 40 of the truncated conical intermediate member 24. Some of this material then passes over the upper surface 42 of the member 24. The remaining portion of the charge passes through the opening 44 in the intermediate member 24 and falls until it is deflected outwardly by the upwardly pointed conical member 26. In the course of these various deflections, the material is evenly distributed as it falls and accumulates in a pile within the refractory walls of the kiln. The cylindrical wear plate 46 deflects to a minor extent a few random stones which otherwise would damage the refractory walls 6.

It will be noted that the selection or deflection of the falling stones happens in sequence, first as the falling mass encounters the edge 36 of the upper member 22, and then as it reaches the upper edge 40 on the intermediate member 24. The illustrated structure which permits the sequential selection of the stones reduces the possibility of any monetary or permanent blockage at the conical deflectors. This permits the use of relatively large openings 38 and 44 which, though acting in combination, are independent of each other insofar as they effect any potential bridging of the material.

Figure 2:
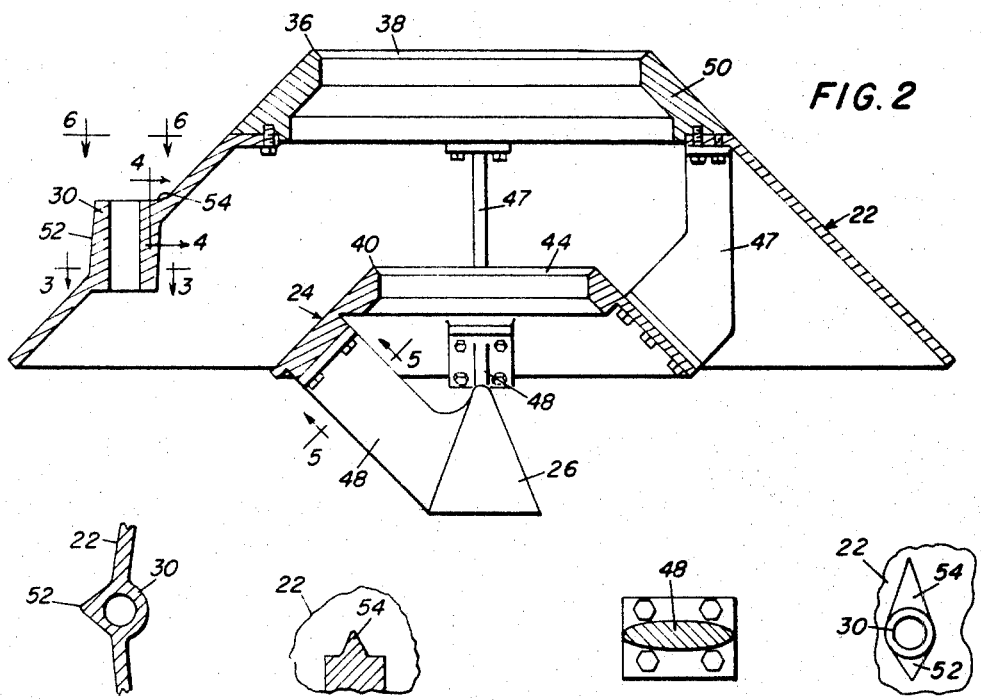
FIG. 2 is an enlarged view of the material distributing device illustrated in FIG. 1.

FIG. 2 discloses in somewhat greater detail the construction of the stone-deflecting members. In this figure, it will be noted that the members 22, 24 and 26 are rigidly interconnected by support brackets 47 and 48, only representative ones of which have been shown in the drawings. The brackets 47 support the intermediate member 24 from the upper member 22, while brackets 48 are used to support the lower member 26 from the intermediate member 24.

In FIG. 2, it will be noted that the upper member 22 includes a removable upper portion 50. This member 50 is of value for two reasons. First, it may be removed and replaced when excessive wear occurs to the apparatus due to the abrasive action of the falling stones. Second, the member 50 may be replaced with a larger or smaller such member in order to vary the effective diameter of the opening 38 in order to vary the distribution pattern of the falling material.

Figures 3, 4, 5, 6:
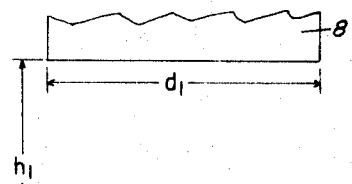
FIGS. 3, 4, 5 and 6 are views taken in FIG. 2 along the lines 3—3, 4—4, 5—5 and 6—6 respectively.

Since one of the objects of this apparatus is to distribute uniformly the charge of stone entering a kiln or other vessel, it is desirable to minimize the stone-deflecting effects of irregularities such as the apertured boss 30 and the supporting rod 28 extending upwardly therefrom. This has been done by avoiding any corners into which the stone may jam in the vicinity of the boss 30. A plan view of the boss 30 with the extending peaked ridges 52 and 54 is shown in FIG. 6. The peaked ridge 54 toward the upper portion of the truncated conical member 22 is shown in FIG. 4, while the lower peaked ridge 52 is shown in FIG. 3. It will be noted also that the support members 47 and 48 are contoured to prevent accumulation of material by shaping them in the streamlined manner shown in FIG. 5.

This preferred embodiment of the invention utilizes true conical or truncated conical members, a centrally located conical lower member 26 and other features which are not absolutely essential to the proper operation of an apparatus of this type. Multi-sided pyramidical structures and other geometrical forms may work equally well. In some environments satisfactory results may be obtained without the lower member 26. On occasions where a wide distribution pattern is desired, more than two truncated conical members may be employed.

Figure 7:
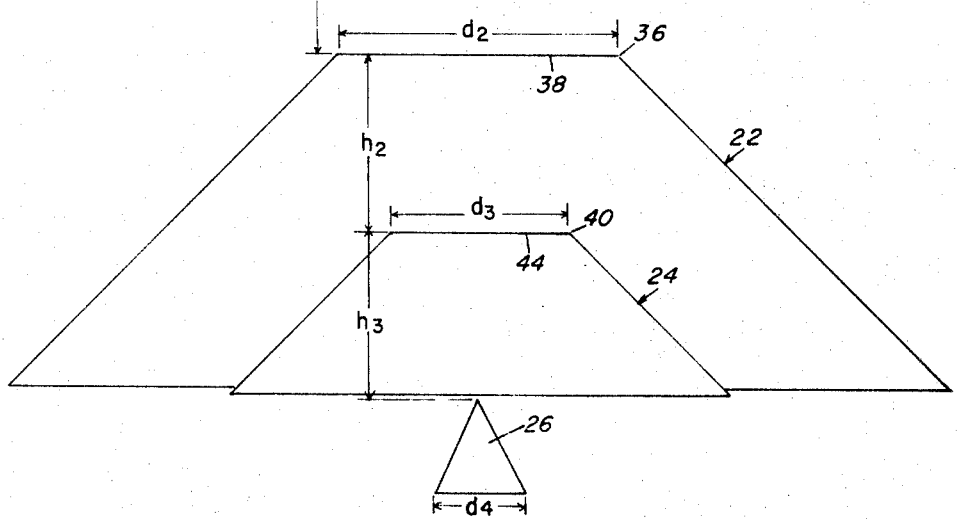
FIG. 7 is a schematic illustration of the preferred embodiment of the invention and its relationship to the charging chute.

FIG. 7 is a schematic view of the preferred embodiment which indicates certain dimensions which are interrelated in order to produce the desired uniform distribution of material in a kiln or other apparatus. In this schematic drawing, dimensions are represented by the following designations:

$d_1$ is the inner diameter of the outlet opening of charging chute 8;

$d_2$ is the effective inner diameter of the opening 38 at the upper end of the truncated conical upper member 22;

$d_3$ is the effective inner diameter of the opening 44 through the truncated conical intermediate member 24;

$d_4$ is the maximum diameter of the lower member 26;

$h_1$ is the vertical dimension between the outlet opening of the charging chute 8 and the upper edge of the truncated conical member 22;

$h_2$ is the vertical dimension between the upper edges 36 and 40 of the truncated conical shells 22 and 24; and $h_3$ is the vertical dimension between the upper edge 40 of the truncated conical shell 24 and the apex of the conical lower member 26.

The precise locations and sizes of the various elements will vary from one installation to another, and will depend on many interrelated factors such as the size of the stone, the relative diameters of the outlet openings of the chute 8 and the upper member 22, and the vertical distances between the various members. Experimentally, it has been determined that the dimensions $d_2$ and $d_3$ should be greater than four times the size of the largest stones in a mass of particulate material. Examples of suitable installations are given below.

*Example I*

In this apparatus, $d_2$ was 9¼ inches and $d_3$ was 6½ inches (more than 4 times the diameter of the large stones). A charge of stones ranging in size from ¾ to 1½ inches was dropped on the apparatus and produced a relatively uniform distribution which was only one inch shallower at the center than at the edges. Using this same apparatus, a charge of smaller stones having a size range of 7/32 inch to ¾ inch was used and produced a distribution pattern which was one inch deeper at the center than at the peripheral portions. Using this data, and the relative dimensions of the apparatus, a full size device such as the one described in the following example may be used.

*Example II*

In this apparatus, $d_1$ is 3 feet, $d_2$ is 3 feet, $d_3$ is 2 feet 2 inches, $d_4$ is 1 foot ½ inch, $h_1$ is 2 feet 8 inches, $h_2$ is 2 feet and $h_3$ is 1 foot 1 inch. This construction is such than $h_1$, $d_1$, and $d_2$ are approximately equal and $h_2$ is approximately equal to $d_3$. Such apparatus will provide a uniform distribution when the surfaces of the conical deflectors 22 and 24 are inclined at 45° from the horizontal. Use is contemplated with charges of small stones ranging in size from 1½ to 3 inches, and with charges of large stones ranging in size from 3 to 6 inches.

From the above data which gives one satisfactory arrangement of the elements, it is possible to extrapolate in order to define in broad terms the relationships between the dimensions $d_1$, $d_2$ and $h_1$. If $d_1$ is greater than $d_2$, then $d_2$ will be greater than $h_1$; while if $d_2$ is greater than $d_1$, $h_1$ will be greater than $d_2$. The structure set forth in Example II and the variations therefrom described in this paragraph may be described methematically as follows:

$$d_1 = d_2 = h_1 \text{ (Example II)}$$

$$d_1 > d_2 > h_1$$

$$h_1 > d_2 > d_1$$

In accordance with usual principles of patent law, it will be recognized that this invention is not directed only to the sole embodiment disclosed or the various examples set forth above. Rather, the invention is to be construed in light of the following claims which encompass numerous variations falling within its scope.

We claim:

1. A material distributing device comprising, a chute with a downwardly directed outlet opening, means to establish a free falling charge of particulate material from said chute, said means being located between said chute and a first deflector member, at least two deflector members, including said first deflector member and a second deflector member, located in the path of said free falling charge of particulate material, said first deflector member being located substantially directly below said outlet opening and having a shape resembling a truncated conical shell with a substantially vertical central axis and having an aperture located centrally in its smaller and uppermost end, said second deflector member concentric with said first deflector member and having a shape resembling a truncated conical shell with an aperture located centrally in its smaller and uppermost end, said second deflector member being smaller than said first deflector member and having its said aperture located below the aperture in said first deflector member.

2. A device according to claim 1 wherein said aperture in said second deflector member has a horizontal dimension adapted to be at least four times the diameter of the largest particles distributed by said device.

3. A device according to claim 1 in which each of said first and second deflector members each has an upper surface with an inclination greater than thirty degrees from horizontal planes.

4. A device according to claim 1 in which each of said first and second deflector members has an upper surface with an inclination of approximately forty-five degrees from horizontal planes.

5. A device according to claim 1 having means resiliently supporting said deflector members to permit horizontal movement thereof with respect to said chute.

6. A device according to claim 1 having means rigidly interconnecting said deflector members, and vertically adjustable support means supporting said deflector members, whereby the vertical distance may be varied between said outlet opening of the chute and the deflector members.

7. A device according to claim 1 in which one of said deflector members includes a removable upper rim portion which may be replaced in the event of excessive wear.

8. A device according to claim 1 having an upwardly pointed conical member concentric with said deflector members, said conical member having its apex located below the aperture in said second deflector member.

9. A device according to claim 1 in which the following relationship exists:

$$d_1 \doteq d_2 \doteq h_1$$

where $d_1$ is the effective diameter of the outlet opening of the chute;

$d_2$ is the effective diameter of the said aperture in the first deflector member; and $h_1$ is the vertical distance from said outlet opening to said first deflector member.

10. A device according to claim 1 in which the following relationship holds true:

$$d_1 > d_2 > h_1$$

where $d_1$ is the effective diameter of the outlet opening of the chute;

$d_2$ is the effective diameter of the said aperture in the first deflector member; and $h_1$ is the vertical distance from said outlet opening to said first deflector member.

11. A device according to claim 1 in which the following relationship exists:

$$h_1 > d_2 > d_1$$

where $d_1$ is the effective diameter of the outlet opening of the chute;

$d_2$ is the effective diameter of the said aperture in the first deflector member; and $h_1$ is the vertical distance from said outlet opening to said first deflector member.

12. A device according to claim 1 in which the vertical distance between said outlet opening and the aperture in said first deflector member is approximately equal to the horizontal dimension of said aperture in said first deflector member.

13. A device according to claim 1 in which the vertical distance between the uppermost end of said first deflector member and the aperture in said second deflector member is approximately equal to the horizontal dimension of the aperture in said second deflector member.

14. A device according to claim 13 in which the vertical distance between said outlet opening and the aperture in said first deflector member is approximately equal to the horizontal dimension of said aperture in said first deflector member.

15. A device according to claim 14 wherein said aperture in said second deflector member has a horizontal dimension adapted to be at least four times the diameter of the largest particles distributed by said device.

16. A device according to claim 15 in which each of said first and second deflector members has an upper surface with an inclination of approximately forty-five degrees from horizontal planes.

17. Apparatus for intercepting and deflecting a free falling mass of particulate material to distribute the mass evenly below said apparatus, said apparatus comprising, means to establish a downwardly directed free falling mass of particulate material, said means being located above an upper deflector member, deflecting means including said upper deflector member, an intermediate deflector member, and a lower deflector member, each of said members located in the path of said free falling mass of particulate material, said upper deflector member having downwardly and outwardly sloping walls radiating from a central aperture, said intermediate deflector member located below the uppermost portion of said upper member and being axially aligned with said upper member, said intermediate member having downwardly and outwardly sloping walls radiating from a central aperture, and said lower deflector member located below the uppermost portion of said intermediate member and being axially aligned with the upper member, said lower member having an upwardly directed central apex.

18. Apparatus according to claim 17 in which said upper and intermediate members are truncated conical shells having an inclination from horizontal planes of more than 30°.

19. Apparatus according to claim 17 in which said upper member has its aperture spaced above the aperture in said intermediate member by a distance approximately equal to the horizontal dimension of the aperture in said intermediate member.

20. Apparatus according to claim 17 having a chute with a downwardly directed outlet opening directly above said upper member, and wherein said aperture of said intermediate member has a horizontal dimension adapted to be greater than four times the size of the largest particles distributed by said apparatus.

21. Apparatus according to claim 20 in which said upper member has its aperture spaced above the aperture in said intermediate member by a distance approximately equal to the horizontal dimension of the aperture in said intermediate member.

22. Apparatus according to claim 21 in which the outlet opening of said chute is spaced above said upper member by a distance approximately equal to the horizontal dimension of said aperture in the upper member.

23. A vertical kiln comprising, an elongated upstanding vessel having a refractory lining, a charging chute located directly above said upstanding vessel for charging said vessel with a mass of particulate material to be heated therein, means to establish a free falling charge of said particulate material from said chute, said means being located between said chute and an upper member for deflecting said free falling charge of particulate material, deflecting means located in the path of said free falling charge of particulate material and directly below said charging chute, said deflecting means including said upper member having vertically and coaxially arranged therewith, an intermediate and a lower member for deflecting said free falling charge of particulate material, said upper member having a downwardly and outwardly inclined upper surface and a central aperture, said intermediate member being located below the uppermost portion of said upper member, said intermediate member having downwardly and outwardly inclined walls and a central aperture, and said lower member being located below the uppermost portion of said intermediate member.

24. A vertical kiln according to claim 23 in which said upper and intermediate members are truncated conical shells having an inclination from horizontal planes of more than 30°.

25. A vertical kiln according to claim 23 in which said upper member has its aperture spaced above the aperture in said intermediate member by a distance approximately equal to the horizontal dimension of the aperture in said intermediate member.

26. A vertical kiln according to claim 23 wherein the aperture in said intermediate member has a horizontal dimension adapted to be greater than four times the size of the largest particle deflected by said deflecting means.

27. A vertical kiln according to claim 26 in which said upper member has its aperture spaced above the aperture in said intermediate member by a distatnce approximately equal to the horizontal dimension of the aperture in said intermediate member.

28. A vertical kiln according to claim 27 in which the outlet opening of said chute is spaced above said upper member by a distance approximately equal to the horizontal dimension of said aperture in the upper member.

References Cited

UNITED STATES PATENTS

| | | | |
|---|---|---|---|
| 865,659 | 9/1907 | Scott | 263—29 X |
| 3,137,399 | 6/1964 | Renkes et al. | 214—35 |

FOREIGN PATENTS 846,373  8/1960  Great Britain.

JOHN J. CAMBY, *Primary Examiner.*

U.S. Cl. X.R.

214—35